(12) United States Patent
Lee et al.

(10) Patent No.: US 11,315,222 B2
(45) Date of Patent: Apr. 26, 2022

(54) IMAGE PROCESSING APPARATUS AND IMAGE PROCESSING METHOD THEREOF

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Hyunseung Lee, Suwon-si (KR); MunChurl Kim, Daejeon (KR); Yongwoo Kim, Daejeon (KR); Jae Seok Choi, Daejeon (KR); Youngsu Moon, Suwon-si (KR); Cheon Lee, Suwon-si (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 41 days.

(21) Appl. No.: 16/862,958

(22) Filed: Apr. 30, 2020

(65) Prior Publication Data

US 2020/0349677 A1    Nov. 5, 2020

(30) Foreign Application Priority Data

May 3, 2019    (KR) .................. 10-2019-0052524

(51) Int. Cl.
  *G06T 5/00*    (2006.01)
  *G06T 7/13*    (2017.01)
  *G06T 5/50*    (2006.01)

(52) U.S. Cl.
  CPC ............... *G06T 5/002* (2013.01); *G06T 5/50* (2013.01); *G06T 7/13* (2017.01); *G06T 2207/20081* (2013.01)

(58) Field of Classification Search
  CPC .......... G06T 5/002; G06T 5/50; G06T 5/001; G06T 5/003; G06T 5/00; G06T 7/13;
  (Continued)

(56) References Cited

U.S. PATENT DOCUMENTS 10,032,256 B1    7/2018   Anaya et al.
11,026,642 B2 *  6/2021   Tang .................. A61B 6/032
                          (Continued)

FOREIGN PATENT DOCUMENTS

KR    10-2018-0119753 A    11/2018
KR       10-1922964 B1     11/2018
                (Continued)

OTHER PUBLICATIONS

International Search Report and Written Opinion (PCT/ISA/210 and PCT/ISA/237) dated Aug. 11, 2020, issued by the International Searching Authority in International Application No. PCT/KR2020/005551.

(Continued)

*Primary Examiner* — Jose L Couso
(74) *Attorney, Agent, or Firm* — Sughrue Mion, PLLC

(57) ABSTRACT

An image processing apparatus obtains a first output image by applying an image to a first training network model, obtains a second output image by applying the image to a second training network model, and obtains a reconstructed image based on the first output image and the second output image. The first training network model is a model that uses a fixed parameter obtained through training of a plurality of sample images, the second training network model is trained to minimize a difference between a target image corresponding to the image and the reconstructed image.

18 Claims, 10 Drawing Sheets

(58) Field of Classification Search
CPC . G06T 7/0002; G06T 7/11; G06T 7/30; G06T 7/44; G06T 2207/20081; G06T 2207/20084; G06T 2207/20221; G06T 2207/20008; G06T 2207/30168; G06T 2207/20182; G06T 3/4053; G06T 3/4046; G06T 3/4069; G06T 3/4076; G06T 3/403; G06T 1/20; G06N 3/08–088; G06N 3/0481; G06N 3/0445; G06N 3/0476; G06N 3/04; G06N 20/00; G06N 20/10; G06N 99/00; H04N 19/124; H04N 19/136; H04N 19/176; H04N 19/80; H04N 19/86; H04N 19/117; G06F 17/16; G06K 9/6256; G06K 9/6255; G06K 9/6272; G06K 9/6215; G06K 9/40; G06K 9/46; G06K 9/66; G06K 9/00288; G06K 9/6262; G06K 9/6267; G06K 9/6273
See application file for complete search history.

(56) References Cited

U.S. PATENT DOCUMENTS

| | | | |
|---|---|---|---|
| 2016/0379352 A1 | 12/2016 | Zhang et al. | |
| 2017/0236057 A1* | 8/2017 | Lane | G06N 3/0454 706/25 |
| 2017/0316542 A1* | 11/2017 | Shibata | G06T 5/002 |
| 2018/0293707 A1 | 10/2018 | El-Khamy et al. | |
| 2019/0138853 A1* | 5/2019 | Goncalves | G06N 3/088 |
| 2019/0294108 A1* | 9/2019 | Ozcan | G03H 1/0486 |
| 2019/0333190 A1* | 10/2019 | Schroers | G06N 3/0454 |
| 2019/0365341 A1* | 12/2019 | Chan | G06T 7/0012 |
| 2020/0074661 A1* | 3/2020 | Anisimovskiy | G06T 7/593 |
| 2020/0286263 A1* | 9/2020 | Li | G06T 5/00 |
| 2020/0289077 A1* | 9/2020 | Bai | G06T 11/008 |
| 2020/0311878 A1* | 10/2020 | Matsuura | G06T 5/50 |
| 2020/0336699 A1* | 10/2020 | Kim | H04N 19/124 |

FOREIGN PATENT DOCUMENTS

| | | |
|---|---|---|
| KR | 10-2019-0016539 A | 2/2019 |
| WO | 2015/134900 A1 | 9/2015 |
| WO | 2017/214507 A1 | 12/2017 |

OTHER PUBLICATIONS

Samuel Dodge et al., "Understanding How Image Quality Affects Deep Neural Networks", Cornell University, Apr. 21, 2016, 6 pages.
Jinshan Pan et al., "Learning Dual Convolutional Neural Networks for Low-Level Vision", Cornell University, May 14, 2018, 10 pages.
Samaneh Azadi et al., "Multi-Content GAN for Few-Shot Font Style Transfer," Cornell University, Dec. 1, 2017, 10 pages.
Communication dated Dec. 3, 2021 issued by the European Patent Office in European Application No. 20801819.2.
Jin Yamanaka et al., "Fast and Accurate Image Super Resolution by Deep CNN with Skip Connection and Network in Network", arxiv.org, Jul. 2017, 9 pages total, XP081756733.
Yifan Wang et al., "End-to-End Image Super-Resolution via Deep and Shallow Convolutional Networks", IEEE Access, vol. 7, DOI: 10.1109/ACCESS.2019.2903582, Mar. 2019, 12 pages total, XP011715773.
Jun-Ho Choi et al., "Deep Learning-based Image Super-Resolution Considering Quantitative and Perceptual Quality", arxiv.org, arXiv:1809.04789v2 [cs.CV], Apr. 2019, 27 pages total, XP081201311.
Saeed Anwar et al., "A Deep Journey into Super-resolution: A Survey", arxiv.org, arXiv:1904.07523v1 [cs.CV], Apr. 2019, 18 pages total, XP081169884.

* cited by examiner

IMAGE PROCESSING APPARATUS AND IMAGE PROCESSING METHOD THEREOF

CROSS-REFERENCE TO RELATED APPLICATIONS

This application claims priority from Korean Patent Application No. 10-2019-0052524, filed on May 3, 2019, in the Korean Intellectual Property Office, the disclosure of which is herein incorporated by reference in its entirety.

BACKGROUND

1. Field of the Invention

Devices and methods consistent with the subject matter disclosed herein relate to a support device and an image forming apparatus having the same, and more particularly, to a support device capable of preventing displacement of a tray on which a developing unit is mounted while the tray is in a process of being detached from an image forming apparatus, and an image forming apparatus having the same.

2. Description of the Related Art

With the development of electronic display technology, various types of electronic apparatuses have been developed and widely used. Particularly, display apparatuses that are used in homes, offices, public places, or the like have been developed in recent years.

Recently, high resolution display panels such as 4K UHD TV have been widely implemented. However, development and availability of high-resolution content has lagged the development of high resolution display panels. Accordingly, various techniques for generating high-resolution content from low-resolution content are required. In addition, image compression such as MPEG/H.264/HEVC may cause image quality degradation or deterioration, and a technique for reconstructing deteriorated image content is required.

Recently, artificial intelligence systems that implement human-level artificial intelligence (AI) have been implemented in various fields. An artificial intelligence system is a system in which the machine learns, judges and becomes smart, unlike a conventional rules-based smart system. The more the artificial intelligence system is used, the higher the recognition rate and the better understanding of user's preferences. Thus, the conventional rule-based smart system has been gradually replaced by a deep-learning based artificial intelligence system.

Artificial intelligence technology consists of machine learning (e.g., deep-learning) and element technologies that use machine learning.

Machine learning is an algorithm technology that classifies/trains the characteristics of input data by itself. Element technology is a technology that simulates functions, such as recognition and judgment of the human brain, using a machine learning algorithm such as deep learning and includes linguistic understanding, visual understanding, reasoning/prediction, knowledge representation, motion control, etc.

There has been an attempt to improve image quality by using an artificial intelligence technique in a conventional image processing apparatus. However, there is limitation on image reconstruction quality in the conventional image processing apparatus because of using a training network model trained by using a fixed sample image or a training image. Therefore, a technique is in demand for reducing occurrence of distortion and providing a high resolution image to a user.

SUMMARY

Aspects of the embodiments relate to reconstructing deteriorated image content by using a plurality of training network models trained based on various deteriorated images, and increasing the resolution of an image and an image processing method thereof.

According to an embodiment, there is provided an image processing apparatus including a memory configured to store at least one command, a processor electrically connected to the memory, wherein the processor is further configured to obtain a first output image output from a first training network model based on an input image input to the first training network model, obtain a second output image output from a second training network model based on the input image input to the second training network model, and obtain a reconstructed image based on the first output image and the second output image, wherein the first training network model is configured based on a fixed parameter obtained through training of a plurality of sample images, and wherein the second training network model is trained to minimize a difference between a target image corresponding to the image and the reconstructed image.

The processor may be further configured to obtain the image by deteriorating at least one characteristic of a training image.

The processor may be further configured to perform blurring of the training image by applying a filter, identify a first edge area and a texture area based on the training image on which blurring is performed, obtain a second edge area to which a noise is applied by compressing the first edge area, and acquire the image based on the second edge area and the texture area.

The processor may be further configured to obtain a differential image obtained by deducting an average pixel value of the second output image from the second output image, and obtain the reconstructed image by adding the differential image to the first output image.

The processor may be further configured to obtain a weight corresponding to an image characteristic of each of a plurality of areas included in the differential image by applying the differential image to the second training network model, and obtain the differential image in which the weight is applied to each of the plurality of areas.

The second training network model may be configured to store information on the weight corresponding to the image characteristic, and train the information on the weight to minimize the difference between the target image and the reconstructed image based on the image characteristic of each of the plurality of areas.

The processor may be further configured to obtain the difference between the target image and the reconstructed image by applying the reconstructed image to a third training network model, wherein the second training network model is trained to minimize the difference between the target image and the reconstructed image based on the value, and wherein the third training network model is trained to identify the difference between the target image and the reconstructed image.

The training image and the reconstructed image may be high resolution images of 4K Ultra High Definition (UHD) or 8K UHD.

Each of the first and second training network models may include a plurality of layers, wherein a second number of layers included in the second training network model is greater than a first number of layers included in the first training network model.

The apparatus may further include a display, wherein the processor is further configured to control the display to display the reconstructed image.

According to an embodiment, there is provided an image processing method of an image processing apparatus, the method including obtaining a first output image output from a first training network model based on an input image input to the first training network model, obtaining a second output image output from a second training network model based on the input image input to the second training network model, and obtaining a reconstructed image based on the first output image and the second output image, wherein the first training network model is configured based on a fixed parameter obtained through training of a plurality of sample images, and wherein the second training network model is trained to minimize a difference between a target image corresponding to the image and the reconstructed image.

The method may further include obtaining the image by deteriorating at least one characteristic of a training image.

The obtaining of the image may include performing blurring of the training image by applying a filter, identifying a first edge area and a texture area based on the training image on which blurring is performed, obtaining a second edge area to which a noise is added by compressing the first edge area, and acquiring the image based on the second edge area and the texture area.

The method may further include obtaining a differential image obtained by deducting an average pixel value of the second output image from the second output image, wherein the obtaining of the reconstructed image comprises obtaining the reconstructed image by adding the differential image to the first output image.

The obtaining of the differential image may include obtaining a weight corresponding to an image characteristic of each of a plurality of areas included in the differential image by applying the differential image to the second training network model, and obtaining the differential image in which the weight is applied to each of the plurality of areas.

The second training network model may store information on the weight corresponding to the image characteristic, and train the information on the weight to minimize the difference between the target image and the reconstructed image based on the image characteristic of each of the plurality of areas.

The method may further include obtaining the difference between the target image and the reconstructed image by applying the reconstructed image to a third training network model, wherein the second training network model is trained to reduce the difference between the target image and the reconstructed image based on the value, and wherein the third training network model is trained to identify the difference between the target image and the reconstructed image.

The training image and the reconstructed image may be high resolution images of 4K Ultra High Definition (UHD) or 8K UHD.

Each of the first and second training network modes may include a plurality of layers, wherein a second number of layers included in the second training network model is greater than a first number of layers included in the first training network model.

The method may further include displaying the reconstructed image.

According to the above-described various embodiments, a user may be provided with a high resolution image with least distortion even in an actual usage environment and a real time streaming image by using a network model trained based on an image in which random components of an image are randomly deteriorated.

DETAILED DESCRIPTION OF EMBODIMENTS

Hereinafter, the disclosure will be described in detail with reference to the accompanying drawings.

All the terms used in this specification including technical and scientific terms have the same meanings as would be generally understood by those skilled in the related art. However, the exact terms may vary according to the understanding of the person skilled in the art, legal or technical interpretation, and the emergence of new technologies. In addition, some terms are selected by the applicant. These terms may be construed in the meaning defined herein and, unless otherwise specified, may be construed on the basis of the entire content of this specification and common technical knowledge in the art.

In this specification, terms such as 'include' and 'have/has' should be construed as designating that there are such features, numbers, operations, elements, components or a combination thereof in the specification, not to exclude the existence or possibility of adding one or more of other features, numbers, operations, elements, components or a combination thereof.

In the disclosure, the expressions "A or B," "at least one of A and/or B," or "one or more of A and/or B," and the like include all possible combinations of the listed items.

Terms such as 'first' and 'second' may be used to modify various elements regardless of order and/or importance. Those terms are only used for the purpose of differentiating a component from other components.

When an element (e.g., a first constituent element) is referred to as being "operatively or communicatively coupled to" or "connected to" an element (e.g., a second constituent element), it should be understood that each constituent element is directly connected or indirectly connected via an constituent element (e.g., a third constituent element).

The singular expression also includes the plural meaning as long as not differently presented in the context.

In an exemplary embodiment, 'a module', 'a unit', or 'a part' perform at least one function or operation, and may be realized as hardware, such as a processor or integrated circuit, software that is executed by a processor, or a combination thereof. In addition, a plurality of 'modules', a plurality of 'units', or a plurality of 'parts' may be integrated into at least one module or chip and may be realized as at least one processor except for 'modules', 'units' or 'parts' that should be realized in a specific hardware.

In this specification, the term 'user' refers to a person using an electronic apparatus or an apparatus using an electronic apparatus (e.g., an artificial intelligence electronic apparatus).

Hereinafter, an embodiment of the disclosure will be described in detail with reference to the accompanying drawings.

Figure 1:
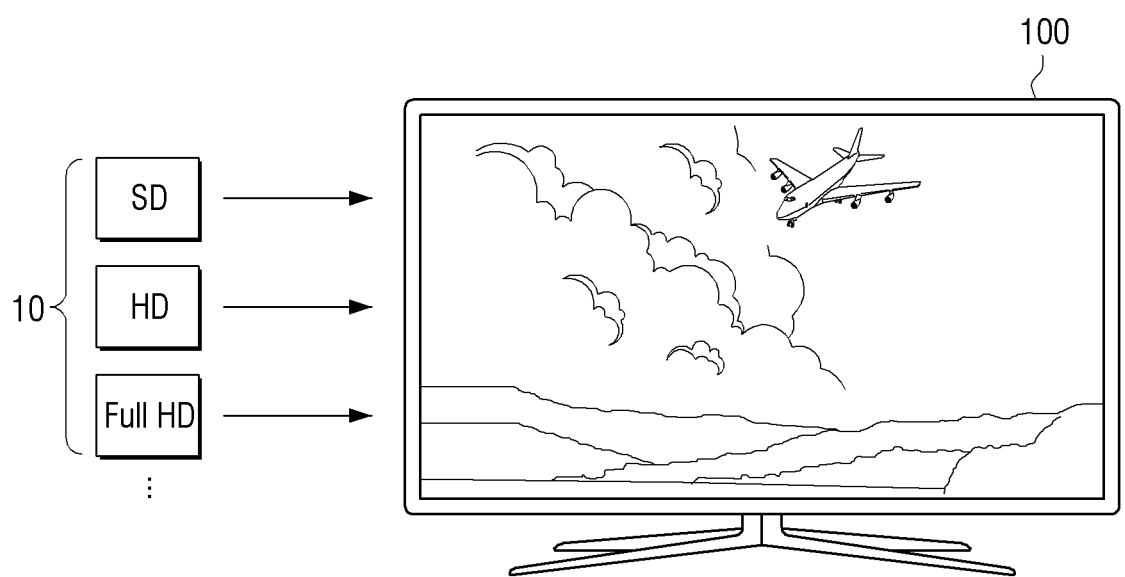
FIG. 1 is a view to explain an image processing apparatus according to an embodiment of the disclosure.

FIG. 1 is a view to explain an embodiment of an image processing apparatus according to an embodiment of the disclosure.

The image processing apparatus 100 may be implemented as a TV as shown in FIG. 1, but the image processing apparatus 100 is not limited thereto. The image processing apparatus 100 may be any device with image processing and/or display capabilities such as a smart phone, a tablet PC, a laptop, head mounted display (HMD), near eye display (NED), large format display (LFD), digital signage, digital information display (DID), video wall, projector display, camera, camcorder, printed, etc.

The image processing apparatus 100 may receive images of various resolutions or various compressed images. For example, the image processing apparatus 100 may receive an image 10 of any one of Standard Definition (SD), High Definition (HD), Full HD, and Ultra HD images. Also, the image processing apparatus 100 may receive the image 10 in a compressed form such as MPEG (for example, MP2, MP4, MP7, etc.), AVC/H.264, HEVC/H.265, etc.

According to an embodiment, although the image processing apparatus 100 is embodied as a UHD TV, images such as Standard Definition (SD), High Definition (HD), Full HD, etc. (hereinafter referred to as a low resolution image) may be input because of lack of the Ultra High Definition (UHD) content. In this case, a method for enlarging an input low resolution image to a UHD image (hereinafter referred to as high resolution image) may be used. For example, a high resolution image may be obtained by applying a low resolution image to a training network model and enlarging the low resolution image. However, a problem lies in that, if the image characteristic of a plurality of training images used in a process of training the training network model is not similar to the image characteristic of the low resolution image, a high resolution image obtained by applying the training network model to the low resolution image may be significantly distorted.

According to an embodiment, if a training network model intentionally degrades the image quality of a high resolution image to a certain level to obtain an image, and performs training based on the low resolution image in which image quality is degraded to a certain level, the training network model outputs a high resolution image that is significantly distorted with respect to the low resolution image of which image quality is irregularly degraded such as an image or a streaming image received in real time.

Therefore, various embodiments using a method for obtaining a high resolution image by reducing distortion of images (e.g., low resolution images) will be described.

Figure 2:
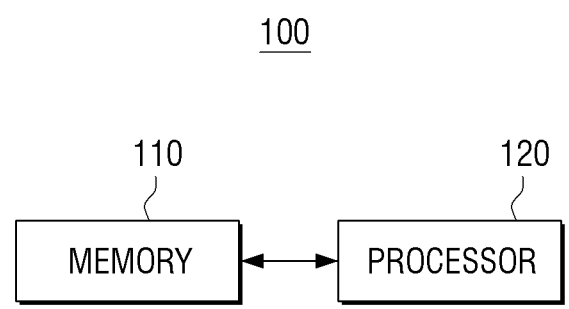
FIG. 2 is a block diagram illustrating a configuration of an image processing apparatus according to an embodiment of the disclosure.

FIG. 2 is a block diagram illustrating a configuration of an image processing apparatus according to an embodiment of the disclosure.

Referring to FIG. 2, an image processing apparatus 100 may include a memory 110 and a processor 120.

The memory 110 may be electrically connected to the processor 120 and may store data necessary for various embodiments of the present disclosure. For example, the memory 110 may be implemented as an internal memory included in the processor 120 such as a ROM (e.g., electrically erasable programmable read-only memory (EEPROM)), random access memory (RAM)), or may be implemented as a separate memory from the memory 120.

The memory 110 may be implemented in the form of a memory embedded in the image processing apparatus 100, or a removable memory in the image processing apparatus 100, depending on the purpose of data storage. For example, data for driving the image processing apparatus 100 may be stored in a memory embedded in the image processing apparatus 100, and data for an expansion function of the image processing apparatus 100 may be stored in a memory attachable to or detachable from the image processing apparatus 100. The memory embedded in the image processing apparatus 100 may be embodied with at least one of a volatile memory (e.g., dynamic RAM, (DRAM), or static RAM (SRAM), synchronous dynamic RAM (SDRAM), or the like), a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (such as NAND flash or NOR flash), a hard drive, or a solid state drive (SSD).

The memory removable from the image processing apparatus 100 may be embodied with a memory card (e.g., a compact flash, a secure digital (SD), a micro secure digital (SD), a mini secure digital (SD), an extreme digital (xD), or the like), an external memory connectable to a USB port (e.g., a USB memory), or the like.

According to an embodiment, the memory 110 may include at least one program executed by the processor 120. The program may be a program for the processor 120 to apply an image 10 to a training network and obtain an output image.

According to an embodiment, the memory 110 may store a training network model according to various embodiments of the disclosure. The training network model may be a machine learning model based on a plurality of images. For example, the training network model may be a Convolution Neural Network (CNN) trained model based on at least one of a plurality of sample images, a training image or the image 10. CNN may be a multi-layer neural network having a unique connection structure designed for image processing, or the like. The training network model is not limited to CNN. For example, the training network model may be embodied as a Deep Neural Network (DNN) model of at least one of Recurrent Neural Network (RNN), Long Short Term Memory Network (LSTM), Gated Recurrent Units (GRU) or Generative Adversarial Networks (GAN). The memory 110 according to an embodiment of the disclosure. The memory 110 according to an embodiment may store heterogeneous training network models. However, according to an example, at least one training network model may be stored in at least one of an external device or an external server.

The processor 120 may be electrically connected, such as via one or more busses, to the memory 110 to control the overall operation of the image processing apparatus 100.

According to an embodiment, the processor 120 may be implemented as a digital signal processor (DSP), a microprocessor, an Artificial Intelligence (AI) processor, or a Time Controller (TCON), but is not limited thereto. The processor 120 may include one or more central processing unit (CPU), a microcontroller unit (MCU), a micro processing unit (MPU), a controller, an application processor (AP), or a communication processor (CP), an ARM processor, and the like, or may be defined by the corresponding terms. The processor 120 may be implemented as a system on chip (SoC), a large scale integration (LSI) with a built-in processing algorithm, or in the form of Field Programmable Gate Array (FPGA).

The processor 120 may obtain a reconstructed image corresponding to the image by applying the image 10 to a training network model. For example, the training network model may output a reconstructed image in high resolution by increasing the resolution of the image 10. The image 10 may include an image initially produced in low resolution as well as a low resolution image that lost image quality resulting from compression, etc.

The reconstructed image may be a Ultra High Definition (UHD) image, particularly, a 4K UHD image or an 8K UHD image, but the reconstructed image is not limited thereto.

The processor 120 may obtain a first output image by applying the image 10 to the first training network model, and a second output image by applying the image 10 to a second training network model. The processor 120 may obtain reconstructed images based on the first output image and the second output image.

The first training network model may generate an output image without additional training by using a fixed parameter, and the second training network model may be a model training to reduce the difference between a reconstructed image and a target image.

The first training network model may implement a low complexity model having a smaller size and/or lower complexity than that of the second training network model. The processor 120 may obtain a reconstructed image similar to the target image by using both the first training network model and the second training network model.

According to an embodiment, the processor 120 may not fix the image used for training the second training network model, but may randomly deteriorate the image to obtain a new training image, and then trains the second training network model by using the image. In this case, image distortion may be reduced in a real-time streaming image.

Hereinafter, various embodiments using a method for obtaining a reconstructed image by using the first and second training network modes will be described in detail.

Figure 3:
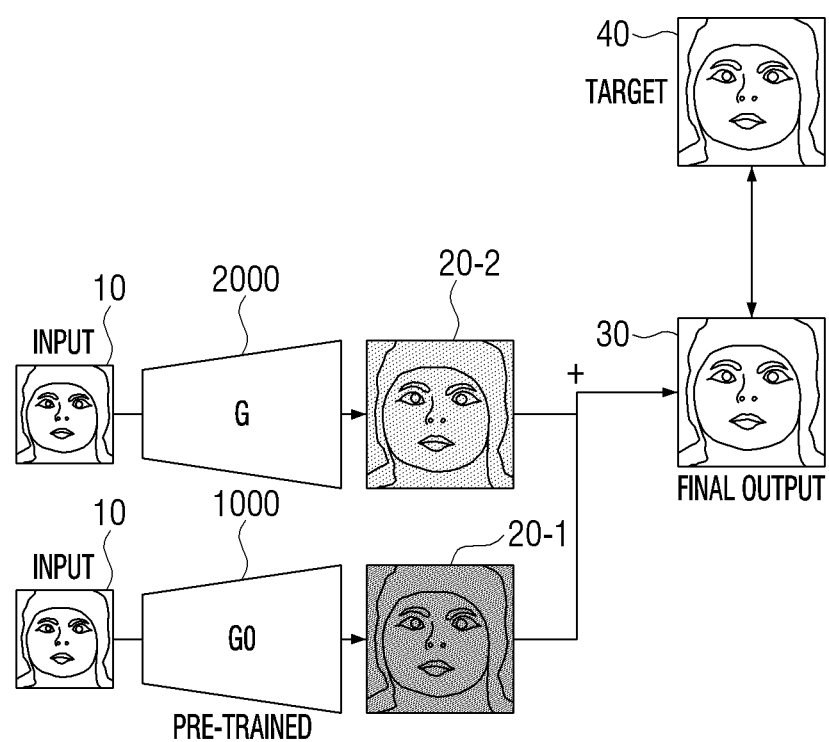
FIG. 3 is a view to explain a first training network model and a second training network model according to an embodiment of the disclosure.

FIG. 3 is a view to explain first and second training network models according to an embodiment of the disclosure Referring to FIG. 3, the processor 120 may obtain a first output image 20-1 by applying the image to a first training network model 1000. The first training network model 1000 may be a network model pre-trained based on a plurality of sample images. The first training network model 1000 may be a pre-trained model, based on loss function, to cause fixed loss between a target image corresponding to the sample image and a first output image 20-1 obtained by applying the sample image to the first training network model 1000.

The loss function may be a function used to calculate the between output data obtained by applying input data to a training network model and target data corresponding to the input data (e.g., actual data, correct data or original data). According to an embodiment, the loss function may be a function used to calculate the difference between the output image obtained by applying the image 10 to the training network model and the high resolution image. The fixed loss may refer to an absolute value (or, absolute loss) L1 loss (L1 loss) of the difference between the output image and the target image (or, error). However, the L1 loss (L1 loss) is merely exemplary, but is not limited thereto. For example, the loss function may be implemented as a function of calculating the mean squared error (MSE) of the error between the output data and the target data or the mean squared deviation (MSD) of the deviation, and the first training network model 1000 may be a pre-trained model so that fixed loss L2 loss (or squared loss) occurs based on the loss function.

The first training network model 1000 may be a model using a fixed parameter obtained through training of a plurality of sample images. For example, the first training network model 1000 may be a CNN or Deep residual network (DSR) based pre-trained network model, and may output a first output image 20-1 to cause the L1 loss between the first output image 20-1 corresponding to the image 10 and a target image 40 corresponding to the image 10. The first training network model 1000 may not perform additional training according to the input of the image 10, but output the first output image 20-1 corresponding to the image 10 by using a fixed parameter.

The processor 120 may obtain a second output image 20-2 by applying the image 10 to a second training network model 2000. The second training network model 2000 may be a model trained to output a high resolution image corresponding to the image by increasing the resolution of the image 10. For example, the second training network model 2000 may be a trained model to increase the resolution of the image 10, remove noise, improve texture, and output the second output image 20-2 corresponding to the image 10. The first and second images 20-1 and 20-2 may be a high resolution image corresponding to the image 10 by upscaling the resolution of the image 10.

The second training network model 2000 may be a Generative Adversarial Networks (GAN) based model. The GAN may consist of a generator (G) to generate a virtual data sample, and a discriminator (D) to determine whether the input data sample is actual data. GAN may refer to a machine learning model established through adversarial training between the generator and the discriminator. The generator (G) (hereinafter referred to as the second training network model 2000) may be a model trained to reduce the difference between the second output image 20-2 generated by itself and the target image 40. The discriminator (D) may be a model for identifying a difference value between the second output image 20-2 and the target image 40.

According to an embodiment, the processor 120 may obtain a reconstructed image 30 based on the first output image 20-1 generated by the first training network model 1000 and the second output image 20-2 generated by the second training network model 2000. The second training network model 2000 may be a model trained to reduce the difference value between the reconstructed image 30 and the target image 40. In accordance with training, the second training network model 2000 may generate the second output image 20-2 to render the reconstructed image 30 to be similar to the target image 40. The discriminator (D) may be a model to identify the difference value between the reconstructed image 30 and the target image 40.

The processor 120 may obtain the image 10 by randomly deteriorating at least one of the characteristics of the training image. The processor 120 may apply the image to each of the first and second training network models 1000 and 2000.

Figure 4:
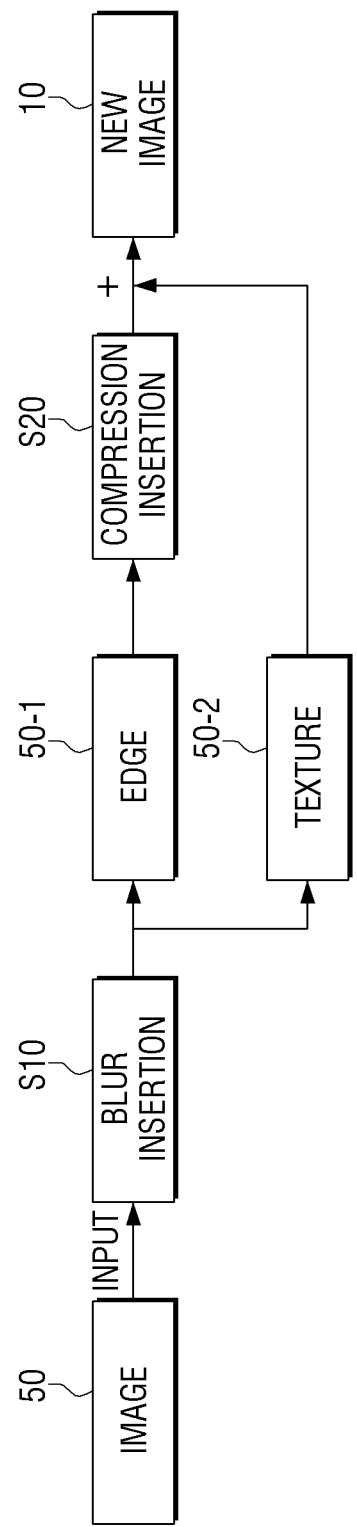
FIG. 4 is a view to explain a method for obtaining an image in which image quality is deteriorated according to an embodiment of the disclosure.

FIG. 4 is a view to explain a method for obtaining an image in which image quality is deteriorated according to an embodiment of the disclosure.

Referring to FIG. 4, the processor 120 may obtain a new training image by randomly deteriorating at least one of the characteristics of the training image 50.

The characteristic of the training image 50 may refer to at least one of texture area, edge direction, edge strength, grayscale value, brightness, contrast or gamma value according to a plurality of pixels included in the training image 50. The processor 120 may reduce the resolution of the training image 50, insert noise into the training image 50, and perform blurring of the training image 50 to obtain a new training image with deteriorated image quality, i.e. the image 10. The image 10 obtained from the training image 50 may be a deteriorated image in which texture area, edge direction, edge strength, grayscale value, brightness, contrast or gamma value are changed compared to the training image 50. However, the image deterioration is merely exemplary, and is not limited thereto. For example, the processor 120 may obtain a new training image in which image quality is deteriorated by a way of changing the format of the training image 50, or compressing the training image.

The processor 120 may obtain the image 10 by inserting noise of a random size of intensity into the training image 50. According to an example, the processor 120 may obtain the image 10 including the random noise by performing compression of the training image 50 according to an arbitrary compression method. The reason for deteriorating the training image 50 by inserting random noises is to output an image in high resolution without distortion by the training network model performing training based on various deteriorated image and performing appropriate image processing on the deteriorated image received in real time.

The processor 120 may obtain the image 10 by maintaining the texture area of the training image 50 and selectively deteriorating an edge area (e.g., at least one of edge direction or edge intensity). For example, referring to FIG. 4, blurring may be performed on the training image 50 by applying a random filter in step S10. The random filter means that the type or intensity of filter is set randomly. For example, the processor 120 may perform blurring of the training image 50 by applying low-pass filter with a random intensity such as Gaussian blurring (or Gaussian filtering). Gaussian blurring may be a method to performing blurring by using a Gaussian filter based on possibility distribution, and if a Gaussian filter is applied to the training image 50, a high frequency component may be blocked and the training image may be blurred. According to an embodiment, the processor 120 may perform blurring of a random area of the training image 50 by applying a random filter, and maintain the remaining area.

The processor 120 may identify an edge area and a texture area based on the blurred image. For example, the processor 120 may divide the blurred image into an edge area 50-1 and a texture area 50-2 by applying a guided filter to the blurred image. The guided filter may be a filter used to divide the image into a base layer and a detail layer. The processor 120 may identify the edge area 50-1 based on the base layer and the texture area 50-2 based on the detail layer.

The processor 120 may obtain the edge area to which random noise is added by compressing the edge area 50-1 that is identified in step S20. For example, the processor 120 may compress a random area of the edge area 50-1 and maintain the remaining area to obtain the edge area to which random noise is added. According to an example, the processor 120 may obtain the edge area 50-1 to which random noise is added by compressing the edge area 50-1 (or, a random compression rate). For example, the processor 120 may obtain the edge area 50-1 to which random noise is added by compressing the edge area 50-1 in a random format. The processor 120 may obtain the edge area 50-1 to which noise is added using various methods.

The processor 120 may obtain the image 10, i.e. anew training image by adding the edge area 50-1 to which noise is added to the texture area 50-2.

The processor 120 may obtain the reconstructed image 30 by applying a new training image to first and second training network models 1000 and 2000.

Figure 5:
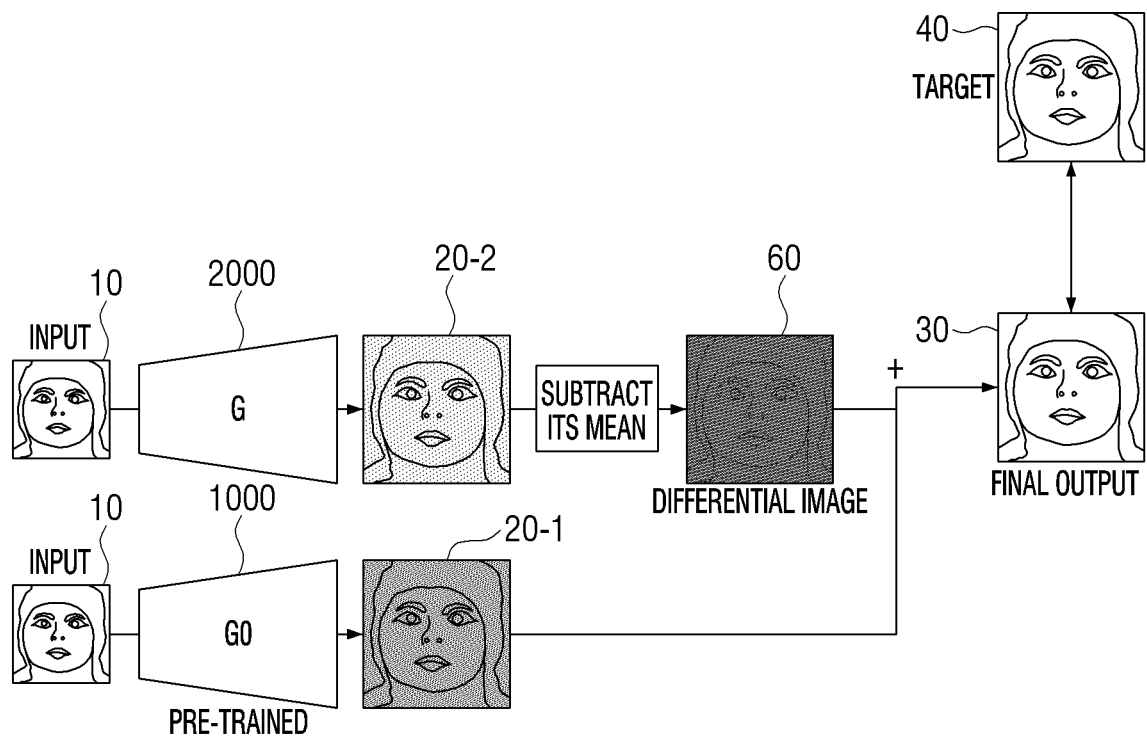
FIG. 5 is a view to explain a method for obtaining a reconstructed image according to an embodiment of the disclosure.

FIG. 5 is a view to explain a method for obtaining a reconstructed image according to an embodiment of the disclosure.

Referring to FIG. 5, the processor 120 may obtain a differential image 60 from a second output image 20-2. For example, the processor 120 may obtain the differential image 60 obtained by deducting an average pixel value of the second output image 20-2 from the second output image 20-2. However, the disclosure is not limited thereto, but the differential image 60 may be obtained by deducting the value obtained by giving a weight to an average pixel value of the second output image 20-2, or a minimum pixel value or a maximum pixel value of the second output image 20-2 from the second output image 20-2.

The processor 120 may obtain the reconstructed image 30 by adding the differential image 60 to the first output image 20-1.

The processor 120 may adjust a pixel value of the differential image 60 so that the average pixel value of the differential image 60 may be within a threshold value in order to smooth a flicker phenomenon according to the output of the reconstructed image 30. For example, the processor 120 may adjust a pixel value of the differential image 60 so that the average pixel value of the differential image 60 may be 0. The flicker phenomenon means that user recognizable flicker, screen shaking, etc. occurs because the output luminance, grayscale, etc. of LED according to the reconstructed image 30 changes due to a slight change of a current flowing through the LED. The flicker phenomenon could be smoothed by adjusting the average pixel value of the differential image 60 to be 0.

The processor 120 may obtain a weight corresponding to image characteristic of each of a plurality of areas included in the differential image 60 by applying the differential image 60 to the second training network model 2000. The processor 120 may obtain the differential image 60 by applying the weight to each of the plurality of areas.

Figure 6:
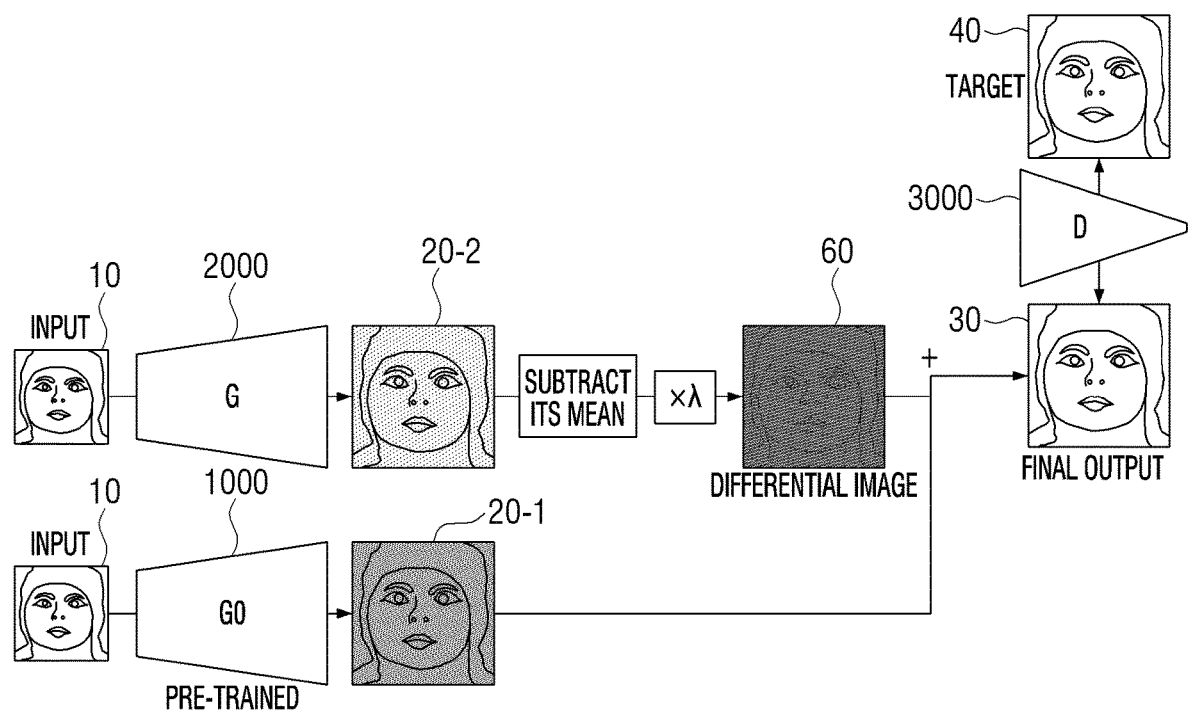
FIG. 6 is a view to explain a weight and a third training network model according to an embodiment of the disclosure.

FIG. 6 is a view to explain a weight and a third training network model according to an embodiment of the disclosure.

Referring to FIG. 6, the processor 120 may apply a weight (λ) to at least one of the second output image 20-2 or the differential image 60. The processor 120 may apply the weight (λ) of 0 or 1 to the differential image 60. The processor 120 may obtain the reconstructed image 30 based on the first output image 20-1 except for the differential image 60 by applying the weight (λ) of 0 to the differential image 60. The processor 120 may obtain the reconstructed image 30 based on the differential image 60 or the first output image 20-1 by applying the weight (λ) of 1 to the differential image 60.

For an example, the processor 120 may obtain the weight (λ) corresponding to the image characteristic of each of the plurality of areas included in the differential image 60 by applying the differential image 60 to the second training network model 2000. The image characteristic may include at least one of texture area, edge direction, edge strength, grayscale value, brightness, contrast or gamma value of the image. The second training network model 2000 may store information on the weight (λ) corresponding to the image characteristic, and train information on the weight (λ) to reduce the difference value between the target image 40 and the reconstructed image 30 based on the image characteristic of each of the plurality of areas.

The processor 120 may obtain a differential image 60' by applying the weight (λ) corresponding to each of the plurality of areas.

Referring to FIG. 6, the processor 120 may obtain the difference value between the target image 40 and the reconstructed image 30 by applying the reconstructed image 30 to a third training network model 3000.

The second training network model 2000 may be trained to reduce the difference between the target image 40 and the reconstructed image 30. For example, the second training network model 2000 may be trained so that the reconstructed image 30 may be the same or substantially similar to the target image 40. Depending on training, the second training network model 2000 may generate the second output image 20-2, and the processor 120 may obtain the reconstructed image 30 in which the difference from the target image 40 is reduced based on the first and second output images 20-1 and 20-2.

The second training network model 2000 may train based on new training images that are arbitrarily deteriorated in various ways or new training images that are not uniformly deteriorated, not a predetermined algorithm. The processor 120 may obtain a high resolution reconstructed image by applying a low resolution real time image or streaming image to the first and second training network models 1000 and 2000. The probability of high-resolution reconstructed images being distorted can be significantly reduced compared to high-resolution reconstructed images generated from the training network model trained based on a predetermined algorithm (or a training network model trained based on deteriorated image with regularity).

The third training network model 3000 may be trained to identify the difference between the target image 40 and the reconstructed image 30. The second and training network model 2000 and the third training network model 3000 may respectively operate as the generator (G) and the discriminator (D) on the basis of GAN. The second training network model 2000 may be trained so that the image generated by the second training network model 2000 may be the same as or substantially similar to a correct image (or target image). The third training network model 3000 may be trained to identify that the image generated by the second training network model 2000 is different from a correct image. The third training network model 3000 may train to reduce (minimize) the possibility that the second training network model 2000 determines the image generated by itself as a correct image, and the second training network model 2000 may train to increase (maximize) the possibility that the third training network model 3000 determines the image generated by itself as a correct image.

The first and second training network models 1000 and 2000 each may have a plurality of layers, and the number of layers included in the second training network model 2000 may be larger than the number of layers included in the first training network model 1000.

Figure 7:
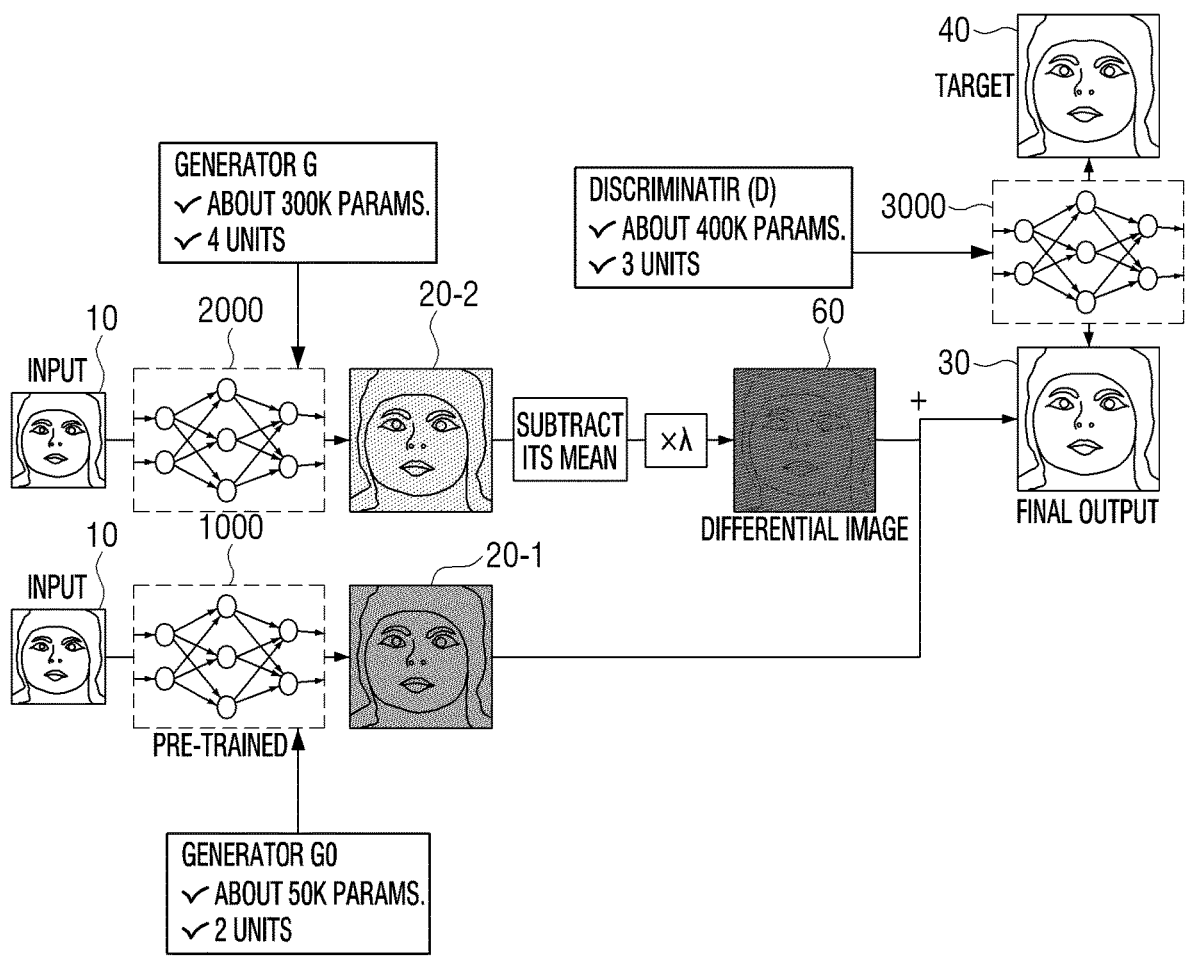
FIG. 7 is a view to explain respective sizes of a first training network model, a second training network model, and a third training network model according to an embodiment of the disclosure.

FIG. 7 is a view to explain respective sizes of first, second and third training network models according to an embodiment of the disclosure.

Referring to FIG. 7, the first training network model 1000 may be pre-trained model based on a plurality of sample images. For example, the first training network model 100 may include a plurality of convolution layers. For example, the first training network model 1000 may include a convolution layer and a pooling layer including a convolution calculation and activation function.

The first training network model 1000 may be a model to which residual connection is added. The residual connection may mean a connection structure in which an input value of a prior layer is added to an output value of a present layer and transmitted to a next layer.

For an example, the residual connection means a connection structure in which an input value is output without modification, and a difference between an input value and an output value is trained.

The first training network model 1000 may be embodied with approximately 50K (50,000) parameters. The specific number is only example, and the number of parameters is not limited thereto. For example, the first training network mode 1000 may be a modelled in depth structure including more than 10 layers in total in which two convolution layers and a signal pooling layer are repeatedly disposed. The second training network model 2000 may be a model including a number of layers greater than those of the first training network model 1000. For example, when two convolution layers and a single pooling layer are defined as a single unit, the second training network model 2000 may include four units. In addition, the second training network model 2000 may be a model to which residual connection is added. The second training network model 2000 may be embodied with approximately 300K (300,000) parameters. The specific number is only an example, and the number of parameters is not limited thereto.

The activation function may be various types of functions such as an Identity Function, a Logistic Sigmoid Function, a Hyperbolic Tangent (tan h) Function, a ReLU Function, and a Leaky ReLU Function. For example, the activation function included in the first and second training network models 1000 and 2000 may be a Leaky ReLU Function.

The third training network model 3000 may be a model trained to identify the difference between the target image 40 and the reconstructed image 30. The third training network model 3000 may include a plurality of units. For example, the third training network model 3000 may include three units, and approximately 400K (400,000) parameters.

The first, second and third training network models 1000, 2000 and 3000 may perform padding and stride while performing convolution to variously adjust the size. The padding means filling a specific value (e.g., a pixel value) by a predetermined size in all directions of the received input value. The stride means a shift interval of weight matrix in the process of performing convolution. For example, when stride=3, the training network model may shift the weight matrix by three shifts and perform convolution on the input value.

The number of convolution layers included in the training network model, the number of parameters, and the size of the training network model may be proportional. The first training network model 1000 may have a smaller number of layers compared to the second training network model, which is a low complexity model. The image processing apparatus 100 may arrange the first training network model 1000 with low complexity with the second training network model 2000 in parallel, and obtain the first output image 20-1 with respect to the image 10 to reduce the distortion of the reconstructed image 30 compared to the target image 40.

The image forming apparatus 100 may obtain a new training image by deteriorating a random characteristic among various image characteristics included in the training image 50, and train the second and third training network models 2000 and 3000 by using a new training image.

A bicubic image processing method to obtain a high resolution image by increasing the resolution of the image based on conventional two-dimensional extrapolation has a problem that distortion is found compare to a correct image or an original image.

The reconstructed image 30 obtained from the first and second training network models 1000 and 2000 by the image forming apparatus 100 may be closest to the target image 40 compared to the high resolution image obtained by the conventional bicubic image processing method, and the high resolution image obtained by a conventional GAN model.

Each of the first, second and third training network models 1000, 2000 and 3000 according to various embodiment may be an on-device machine learning model in which the image processing apparatus 100 trains by itself without depending on an external device. However, the on-device machine learning model is merely exemplary, and part of the training network model may operate in an on-device basis, and the remaining training network model may be embodied to operate based on an external server.

Figure 8:
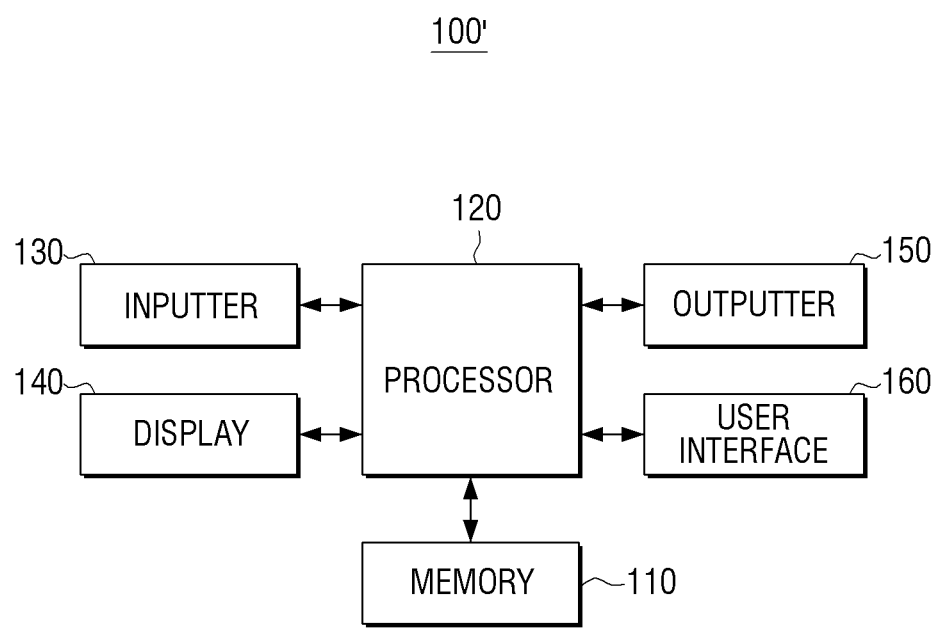
FIG. 8 is a block diagram illustrating a detailed configuration of an image processing apparatus shown in FIG. 2.

FIG. 8 is a block diagram illustrating a detailed configuration of an image processing apparatus shown in FIG. 2.

Referring to FIG. 8, an image processing apparatus 100' may include a memory 110, a processor 120, an inputter 130, a display 140, an outputter 150, and a user interface 160. Descriptions redundant to those of FIG. 2 will be omitted.

According to an embodiment, the memory 110 may be embodied as a single memory that stores data generated from various operations.

However, according to an embodiment, the memory 110 may be embodied to include the first, second and third memories.

The first memory may store at least part of an image input through the inputter 130. The first memory may store at least partial area of an input image frame. In this case, the partial area may be an area necessary for performing image processing according to an embodiment. According to an embodiment, the first memory may be embodied as an N line memory. For example, the N line memory may be a memory that has a capability of 17 lines in a vertical direction, but the N line memory is not limited thereto. For example, when a Full HD image of 1080p (resolution of 1, 920×1,080) is input, only the image area of 17 lines in the Full HD image may be stored in the first memory. The first memory may be embodied as an N line memory, and only some of the input image frame may be stored for image processing because the memory capacity of the first memory is limited due to hardware limitation. The second memory refers to a memory area assigned to a training network model of the entire area of the memory 110.

The third memory may be a memory that stores output images and reconstructed images of the first and second training network models 1000 and 2000, embodied as a memory of various sizes according to various embodiments. For example, when a reconstructed image of high resolution corresponding to the image 10 is obtained and displayed, the third memory may be embodied in a size larger than that of the image.

When a reconstructed image is not stored and displayed, the third memory may not be necessary.

The inputter 130 may receive various types of content, for example, image signals. For example, the inputter 130 may receive image signals in a streaming method or a download method from an external server (e.g., a source device), an external storage medium (e.g., a USB), an external server (e.g., a web-hard), etc. through communication methods such as AP-based Wi-Fi (WiFi, Wireless LAN network), Bluetooth, Zigbee, wired/wireless Local Area Network (LAN), WAN, Ethernet, IEEE-1394, High Definition Multimedia Interface (HDMI), Mobile High-Definition Link (MHL), Universal Serial Bus (USB), Display Port (DP), Thunderbolt, Video Graphics Array (VGA) port, RGB port, D-subminiature (D-SUB), Digital Visual Interface (DVI), etc. The image signals may be digital signals, but the image signals are not limited thereto.

The display 140 may be embodied in the various forms such as a liquid crystal display (LCD), an organic light-emitting diode (OLED), a light-emitting diode (ED), a micro LED, Quantum dot light-emitting diodes (QLED), a liquid crystal on silicon (LCoS), a Digital Light Processing (DLP), a quantum dot (QD) display panel, a video wall, etc. The processor 120 according to an embodiment may control the display 140 to display the reconstructed image 30. The reconstructed image 30 may include real time images, streaming images, etc. of 4K or 8K UHD.

The outputter 150 may output sound signals.

For example, the outputter 150 may convert and amplify digital sound signals processed by the processor 120 into sound signals to output the sound signals. For example, the outputter 150 may include at least one of a speaker unit, a digital/analog (D/A) convertor, an audio amplifier, etc. For example, the outputter 150 may include an L channel speaker and an R channel speaker to respectively reproduce an L channel, and an R channel. However, the disclosure is not limited thereto, but the outputter 150 may be embodied in various formats. For example, the outputter 150 may be embodied in a sound bar shape that reproduces the L channel, the R channel, and the Center channel.

The user interface 160 may be embodied as a button, a touch pad, a mouse, and a keyboard, or embodied as a touch screen, a remote control receiving unit that is capable of performing the display function and the operation input function described above. The button may include various types of input means such as a mechanical button, a touch pad, a whirl, etc. formed in an area such as a front part, a side par, a rear part, etc. of the outside of the body of the image processing apparatus 100.

Although not shown in FIG. 8, it is also possible to additionally apply filtering to remove noise of an input image before image processing. For example, noise can be removed by applying a smoothing filter such as a Gaussian filter, a guided filter for filing an input image against predetermined guidance, etc.

Figure 9:
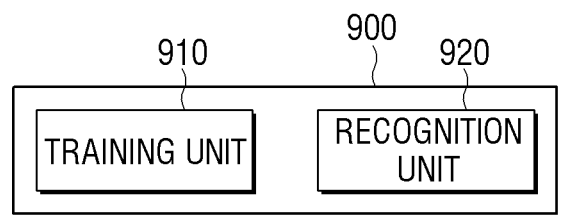
FIG. 9 is a block diagram illustrating a configuration of an image processing apparatus for training and using a training network model according to an embodiment of the disclosure.

FIG. 9 is a block diagram illustrating a configuration of an image processing apparatus for training and using a training network model according to an embodiment of the disclosure.

Referring to FIG. 9, a processor 900 may include at least one of a training unit 910 and a recognition unit 920. The processor 900 of FIG. 9 may correspond to the processor 140 of the image processing apparatus 100 of FIG. 2 or a processor of a data training server.

The processor 900 of the image processing apparatus may include at least one of the training unit 910 and the recognition unit 920 by training and using the second training network model 2000.

The training unit 910 may obtain the second output image 20-2 corresponding to the image 10, and generate or train a recognition model having a reference for acquiring the differential image 60 to render the reconstructed image 30 obtained based on the first output image 20-1 and the second output image 20-2 to be the same or similar to the target image 40. The training unit 910 may generate a recognition model having a determination reference by using collected training data.

For example, the training unit 910 may generate, train or update a model that outputs the second output image 20-2 to reduce the difference value between the target image 40 and the reconstructed image 30.

For an example, the training unit 910 may generate, train or update the model that outputs the differential image 60 and a weight corresponding to each of a plurality of areas included in the differential image 60 to minimize the difference value between the target image 40 and the reconstructed image 30.

The recognition unit 920 may deduce a recognition object or situation included in predetermined data by using predetermined data (e.g., an input image) as input data of a trained recognition model.

The training unit 910 included in the processor 900 for training and using the third training network model 2000 may identify the difference between the reconstructed image 30 and the target image 40, and generate or train the recognition model having a reference to identify that the reconstructed image 30 is different from the target image 40. The training unit 910 may generate a recognition model having a determination reference by using collected training data. The training unit 910 included in the processor 120 for training and using the third training network model 2000 may use predetermined data (e.g., an input image) as input data of the trained recognition model and deduce a recognition object or situation included in predetermined data.

At least part of the training unit 910 and at least part of the acquisition unit 920 may be embodied as a software module and manufactured in the form of one or a plurality of hardware chips to be mounted on the electronic apparatus 100. For example, at least one of the training unit 910 and the acquisition unit 920 may be manufactured in the form of a hardware chip for Artificial Intelligence (AI) only, or manufactured as a part of an existing general processor (e.g. a CPU or an application processor) or a graphic processor (e.g., a GPU) to be implemented in the electronic apparatuses in any number of various ways. The hardware chip for Artificial Intelligence (AI) may be a processor specialized for or dedicated to probability computation having a parallel processing performance higher than the conventional general processor, thereby quickly performing an arithmetic operation in the artificial intelligence field such as machine training. When the training unit 910 and the acquisition unit 920 are implemented as a software module (or a program module including an instruction), the software module may be stored in a non-transitory computer readable media. In this case, the software module may be executed by an operating system (OS) or by a predetermined application. Alternatively, some of the software modules may be provided by an Operating System (OS), and some of the software modules may be provided by a predetermined application.

In this case, the training unit 910 and the recognition unit 920 may be implemented on a single image processing apparatus, or may be provided by separate image processing apparatuses, respectively. For example, one of the training unit 910 and the recognition unit 920 may be implemented in the image processing apparatus 100, and the other may be implemented in an external server. The training unit 910 and the recognition unit 920 may provide model information established by the training unit 910 to the recognition unit 920 in a wired or wireless manner, and data input into the training unit 910 may be provided to the training unit 910 as additional training data.

Figure 10:
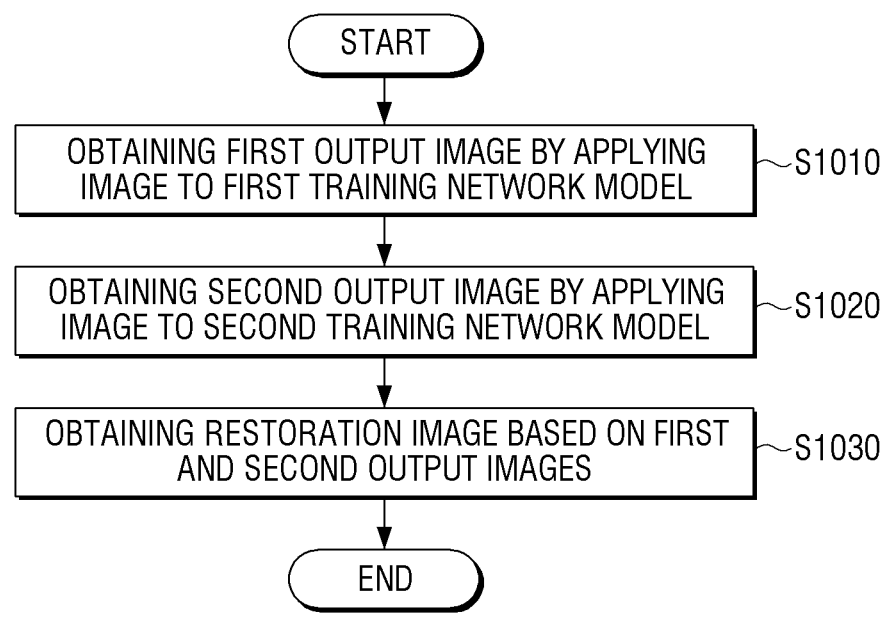
FIG. 10 is a flowchart to explain an image processing method according to an embodiment of the disclosure.

FIG. 10 is a flowchart to explain an image processing method according to an embodiment of the disclosure.

According to an image processing method shown in FIG. 10, a first output image may be obtained by applying an image to a first training network model in step S1010.

A second output image may be obtained by applying an image to a second training network model in step S1020.

A reconstructed image may be obtained based on the first and second output images in step S1030.

The first training network model may use a fixed parameter obtained through training of a plurality of sample images, and the second training network model may train so that a difference value between a target image corresponding to an image and a reconstructed image may be minimized.

The image processing method according to an embodiment may include acquiring an image by randomly deteriorating at least one of characteristics of a training image, the step of S1010 for acquiring the first output image may include obtaining the first output image by applying the obtained image to the first training network model, and the step of S1020 for acquiring the second output image may include obtaining the first output image by applying the obtained image to the second training network model.

The acquiring of the image may include performing blurring of a training image by applying a random filter, identifying an edge area and a texture area based on the blurred image, acquiring an edge area to which random noise is added by compressing the identified edge area, and acquiring an image based on the obtained edge area and the identified texture area.

The image processing method according to an embodiment may include acquiring a differential image obtained by deducting an average pixel value of the second output image from the second output image, and the step S1030 of acquiring a reconstructed image may include acquiring a reconstructed image by adding the differential image to the first output image.

The acquiring of the differential image may include acquiring a weight corresponding to the image characteristic of each of the plurality of areas included in the differential image by applying the differential image to the second training network model, and acquiring the differential image in which a weight is applied to each of the plurality of areas.

The second training network model according to an embodiment may store information on the weight corresponding to the image characteristic, and train information on the weight so that the difference value between the target image and the reconstructed image may be reduced based on the image characteristic of each of the plurality of areas.

In addition, the image processing method according to an embodiment may include acquiring a difference value between a target image and a reconstructed image by applying a reconstructed image to the third training network model, the second training network model may train to reduce the difference between the target image and the reconstructed image based on the difference value, and the third training network model may trains to identify the difference between the target image and the reconstructed image.

The training image and the reconstructed image may be high resolution images of 4K Ultra High Definition (UHD) or 8K UHD.

Each of the first and second training network models may include a plurality of layers, and the number of layers included in the second training network model may be larger than the number of layers included in the first raining network model.

The image processing method may include displaying a reconstructed image.

Various embodiments of the disclosure may be applied to all types of electronic apparatuses such as an image receiving apparatus such as a set-top box, an image processing apparatus, etc. as well as an image processing apparatus.

The various embodiments described above may be implemented in a recording medium that can be read by a computer or a similar device using software, hardware, or a combination thereof. In some cases, embodiments described herein may be implemented by a processor itself. According to software implementation, embodiments such as the procedures and functions described herein may be implemented in separate software modules. Each of the software modules may perform one or more of the functions and operations described herein.

Computer-readable instructions and computer programs for performing a processing operations of a device in accordance with various embodiments described above may be stored in a non-transitory computer-readable medium. The computer instructions stored in the non-volatile computer-readable medium cause a particular device to perform the processing operation according to various embodiments described above when executed by the processor of the particular device.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB) memory stick, a memory card, and a read only memory (ROM), and may be provided.

Although embodiments have been shown and described, it will be appreciated by those skilled in the art that changes may be made to these embodiments without departing from the principles and spirit of the disclosure. Accordingly, the scope of the invention is not construed as being limited to the described embodiments, but is defined by the appended claims as well as equivalents thereto.

What is claimed is:
1. An image processing apparatus, comprising:
a memory configured to store at least one command; and
a processor electrically connected to the memory,
wherein the processor is further configured to:
obtain an input image by deteriorating at least one characteristic of a training image,
obtain a first output image output from a first training network model based on the input image input to the first training network model,
obtain a second output image output from a second training network model based on the input image input to the second training network model, and
obtain a reconstructed image based on the first output image and the second output image,
wherein the first training network model is configured based on a fixed parameter obtained through training of a plurality of sample images, and
wherein the second training network model is trained to minimize a difference between a target image corresponding to the input image and the reconstructed image.

2. The image processing apparatus as claimed in claim 1, wherein the processor is further configured to:
perform blurring of the training image by applying a filter,
identify a first edge area and a texture area based on the training image on which blurring is performed,
obtain a second edge area to which a noise is applied by compressing the first edge area, and
acquire the input image based on the second edge area and the texture area.

3. The image processing apparatus as claimed in claim 2, wherein the processor is further configured to:
obtain a differential image obtained by deducting an average pixel value of the second output image from the second output image, and
obtain the reconstructed image by adding the differential image to the first output image.

4. The image processing apparatus as claimed in claim 3, wherein the processor is further configured to:
obtain a weight corresponding to an image characteristic of each of a plurality of areas included in the differential image by applying the differential image to the second training network model, and
obtain the differential image in which the weight is applied to each of the plurality of areas.

5. The image processing apparatus as claimed in claim 4, wherein the second training network model is configured to:
store information on the weight corresponding to the image characteristic, and
train the information on the weight to minimize the difference between the target image and the reconstructed image based on the image characteristic of each of the plurality of areas.

6. The image processing apparatus as claimed in claim 1, wherein the processor is further configured to:
obtain the difference between the target image and the reconstructed image by applying the reconstructed image to a third training network model,
wherein the second training network model is trained to minimize the difference between the target image and the reconstructed image based on the difference, and
wherein the third training network model is trained to identify the difference between the target image and the reconstructed image.

7. The image processing apparatus as claimed in claim 1, wherein the training image and the reconstructed image are high resolution images of 4K Ultra High Definition (UHD) or 8K UHD.

8. The image processing apparatus as claimed in claim 1, wherein each of the first training network model and the second training network model includes a plurality of layers, and
    wherein a second number of layers included in the second training network model is greater than a first number of layers included in the first training network model.

9. The image processing apparatus as claimed in claim 1, further comprising:
    a display,
    wherein the processor is further configured to control the display to display the reconstructed image.

10. An image processing method of an image processing apparatus, the method comprising:
    obtaining an input image by deteriorating at least one characteristic of a training image;
    obtaining a first output image output from a first training network model based on the input image input to the first training network model;
    obtaining a second output image output from a second training network model based on the input image input to the second training network model; and
    obtaining a reconstructed image based on the first output image and the second output image,
    wherein the first training network model is configured based on a fixed parameter obtained through training of a plurality of sample images, and
    wherein the second training network model is trained to minimize a difference between a target image corresponding to the input image and the reconstructed image.

11. The method as claimed in claim 10, wherein the obtaining the input image comprises:
    performing blurring of the training image by applying a filter;
    identifying a first edge area and a texture area based on the training image on which blurring is performed;
    obtaining a second edge area to which a noise is added by compressing the first edge area; and
    acquiring the input image based on the second edge area and the texture area.

12. The method as claimed in claim 11, further comprising:
    obtaining a differential image obtained by deducting an average pixel value of the second output image from the second output image,
    wherein the obtaining of the reconstructed image comprises obtaining the reconstructed image by adding the differential image to the first output image.

13. The method as claimed in claim 12, wherein the obtaining of the differential image comprises:
    obtaining a weight corresponding to an image characteristic of each of a plurality of areas included in the differential image by applying the differential image to the second training network model; and
    obtaining the differential image in which the weight is applied to each of the plurality of areas.

14. The method as claimed in claim 13, wherein the second training network model is configured to store information on the weight corresponding to the image characteristic, and train the information on the weight to minimize the difference between the target image and the reconstructed image based on the image characteristic of each of the plurality of areas.

15. The method as claimed in claim 10, further comprising:
    obtaining the difference between the target image and the reconstructed image by applying the reconstructed image to a third training network model,
    wherein the second training network model is trained to reduce the difference between the target image and the reconstructed image based on the difference, and
    wherein the third training network model is trained to identify the difference between the target image and the reconstructed image.

16. The method as claimed in claim 10, wherein the training image and the reconstructed image are high resolution images of 4K Ultra High Definition (UHD) or 8K UHD.

17. The method as claimed in claim 10, wherein each of the first training network model and the second training network model includes a plurality of layers, and
    wherein a second number of layers included in the second training network model is greater than a first number of layers included in the first training network model.

18. The method as claimed in claim 10, further comprising:
    displaying the reconstructed image.

\* \* \* \* \*